(12) United States Patent
Wang et al.

(10) Patent No.: US 12,529,443 B2
(45) Date of Patent: Jan. 20, 2026

(54) AMPHIBIOUS ROBOT FOR IN-SERVICE INSPECTION OF DRAINAGE PIPELINES AND CONTROL METHOD THEREOF

(71) Applicant: Shanghai Maritime University, Shanghai (CN)

(72) Inventors: Jianhua Wang, Shanghai (CN); Wenbo Che, Shanghai (CN); Xiang Zheng, Shanghai (CN); Mengdi Zhang, Shanghai (CN); Zijun Pan, Shanghai (CN); Haozhu Wang, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 281 days.

(21) Appl. No.: 18/469,668

(22) Filed: Sep. 19, 2023

(65) Prior Publication Data
US 2024/0093827 A1 Mar. 21, 2024

(30) Foreign Application Priority Data
Sep. 20, 2022 (CN) .......................... 202211140865.9

(51) Int. Cl.
*F16L 55/48* (2006.01)
*B60F 3/00* (2006.01)
(Continued)

(52) U.S. Cl.
CPC ............ *F16L 55/48* (2013.01); *B60F 3/0061* (2013.01); *F16L 2101/30* (2013.01)

(58) Field of Classification Search
CPC ....... F16L 55/48; F16L 2101/30; F16L 55/40; F16L 55/32; F16L 55/30; B60F 3/0061; B60F 3/003
See application file for complete search history.

(56) References Cited

U.S. PATENT DOCUMENTS
2020/0094413 A1 3/2020 Liu et al.

FOREIGN PATENT DOCUMENTS
CN 102412526 A 4/2012
CN 211779672 U 10/2020
(Continued)

OTHER PUBLICATIONS

Notice of first Office action dated Nov. 26, 2024 in SIPO application No. 2022111408659.
(Continued)

*Primary Examiner* — Laura Martin
*Assistant Examiner* — Anthony W Megna Fuentes
(74) *Attorney, Agent, or Firm* — Pilloff Passino & Cosenza LLP; Rachel K. Pilloff; Sean A. Passino

(57) ABSTRACT

An amphibious robot for in-service inspection of drainage pipelines and a control method thereof are provided. The robot includes a robot body, a detection module for detecting environmental state and pose information of robot itself, a propulsion module including a car-like propulsion module and a ship-like propulsion module for controlling robot movement, a structure conversion module for realizing the conversion between the two modes, a ground terminal controller for remote information monitoring and issuing instructions, a mobile terminal controller for receiving instructions and controlling robot movement and structure conversion, and a power module. The control method includes displaying data through the ground terminal controller, processing environmental information collected by the detection module, determining the robot's working mode and switching working mode through the structure conversion module, adopting the ship-like working mode in deep water, and adopting the car-like working mode in the waterless or shallow water environment.

9 Claims, 19 Drawing Sheets

(51) Int. Cl.
  *F16L 55/30* (2006.01)
  *F16L 55/32* (2006.01)
  *F16L 55/40* (2006.01)
  *F16L 101/30* (2006.01)

(56) References Cited

FOREIGN PATENT DOCUMENTS

| | | | | | |
|---|---|---|---|---|---|
| CN | 112078686 | A | | 12/2020 | |
| CN | 112327860 | A | | 2/2021 | |
| CN | 113246674 | A | * | 8/2021 | ............ B60F 3/0061 |
| CN | 114274719 | A | | 4/2022 | |
| CN | 115027191 | A | * | 9/2022 | ................ B60F 5/02 |
| KR | 20190043748 | A | | 4/2019 | |
| WO | WO-2020252139 | A1 | * | 12/2020 | ............. E21B 7/124 |

OTHER PUBLICATIONS

Retrieval report-First search dated Nov. 23, 2024 in SIPO application No. 2022111408659.
Notification to Grant Patent Right for Invention dated Jan. 14, 2025 in SIPO application No. 2022111408659.
Retrieval report-Supplementary search dated Dec. 30, 2024 in SIPO application No. 2022111408659.

* cited by examiner

AMPHIBIOUS ROBOT FOR IN-SERVICE INSPECTION OF DRAINAGE PIPELINES AND CONTROL METHOD THEREOF

CROSS-REFERENCE TO RELATED APPLICATIONS

This disclosure claims priority to Chinese Patent Application No. 202211140865.9, filed on Sep. 20, 2022, the contents of which are hereby incorporated by reference.

TECHNICAL FIELD

The disclosure relates to technical fields of urban underground drainage pipeline network inspection and robots, and in particular to an amphibious robot for in-service inspection of drainage pipelines and a control method thereof.

BACKGROUND

The aging problem of urban underground drainage pipelines is becoming increasingly serious alongside the urbanization. Cracks and damages in the pipelines impair the function of the pipelines. If the inspection is not carried out in time, potential safety hazards are easy to occur, so it is particularly important to inspect pipelines. At present, there are following shortcomings in the inspection process:
(1) The environment in the pipelines is complex, and the water level is uncertain. At present, the pipeline inspection by using car-like inspection equipment usually needs to shut off the water supply and drain the water in the pipeline, while the pipeline inspection by using ship-like inspection equipment is easy to run aground when the water level is low;
(2) In the prior art, the towing cable is used for communication, and positioning is carried out by measuring the length of the towing cable. However, the towing cable is easy to entangle, thus causing resistance to the equipment and affecting the work of the inspection equipment. In practice, the relaxation and bending of the towing cable negatively affect the positioning accuracy of the inspection equipment; and
(3) In the prior art, only one CCTV (Closed Circuit Television) camera is generally used, and the captured images are single and not comprehensive enough. In view of the above problems, an amphibious robot for in-service inspection of drainage pipelines with higher automation and wireless communication and a control method thereof are needed in this field.

SUMMARY

The purpose of the disclosure is to provide an amphibious robot for in-service inspection of drainage pipelines and a control method thereof, so as to inspect the inside of the pipelines in different environments. The flexible mode switching of the structure enables the robot to adapt to environment with varying water depth, such as culverts and the pipelines, enhancing the robot's practicability, so that it is not necessary to shut off water supply during inspection, and all-water-level drainage pipeline inspection is feasible to use.

In order to achieve the above purpose, the disclosure provides an amphibious robot for in-service inspection of drainage pipelines, including a robot body, a detection module, a propulsion module, a structure conversion module, a ground terminal controller, a mobile terminal controller and a power module.

As a carrier of modules, the robot body includes a control box and floating bodies;
the detection module is used for collecting environmental information and pose information of the robot to determine the states of position and orientation of the robot as well as the environmental states within the pipeline;
the propulsion module is used for controlling movement of the robot, and the propulsion module includes a car-like propulsion module and a ship-like propulsion module;
the structure conversion module is used for controlling the robot to switch between structures of a car-like working mode and a ship-like working mode;
the ground terminal controller is used for information integration and instruction transmission, that is, the ground terminal controller receives information collected by the detection module through the mobile terminal controller, and the ground terminal controller sends a structure conversion instruction to the structure conversion module and sends a propulsion instruction to the propulsion module through the mobile terminal controller respectively;
the mobile terminal controller is used for receiving and transmitting the information collected by the detection module, processing the information, and making autonomous control decisions; the mobile terminal controller is also used for receiving the instructions issued by the ground terminal controller, and controlling the movement and structural switching of the robot through the propulsion module and the structure conversion module, respectively; and
the power module is used for supplying power to the detection module, the propulsion module, the structure conversion module, the ground terminal controller and the mobile terminal controller.

Further, in the amphibious robot for in-service inspection of drainage pipelines, the ground terminal controller includes a display screen, an operating handle, a remote controller and the first wireless communication module.

The display screen is used for visualizing the information detected by the detection module in the working process;
the operating handle is used for sending the structure conversion instruction and the propulsion instruction for controlling the robot;
the remote controller is used for remotely monitoring the environmental information and the pose information of the robot at the ground terminal and making robot action decisions; and
the first wireless communication module is used for transceiving remote data of the ground terminal controller;
the mobile terminal controller includes a data interface, a main controller and a second wireless communication module, where
the data interface is used for communication between the mobile terminal controller and the detection module, the structure conversion module and the propulsion module;
the main controller is used for controlling the structure conversion module, the car-like propulsion module and the ship-like propulsion module to perform corresponding operations according to the instructions sent by the remote controller;

the second wireless communication module is used for the remote data transceiving of the mobile terminal controller; and the first wireless communication module is in signal connection with the second wireless communication module.

Further, in the amphibious robot for in-service inspection of drainage pipelines, the detection module includes camera modules installed on the control box, a sonar installed below the control box, a lidar installed on the control box and an inertial measurement unit installed in the control box.

The camera modules include cameras, illumination light sources and platforms, where the cameras and the illumination light sources are both installed on the platforms;

the sonar is used for detecting the water depth and underwater environment in the pipeline;

the lidar is used for sensing the environment above the water surface in the pipeline; and the inertial measurement unit is used for sensing the position information and the orientation information of the robot.

Further, in the amphibious robot for in-service inspection of drainage pipeline, the detection module further includes a GPS positioning module, the GPS positioning module is installed on the control box, and the GPS positioning module is used for obtaining geographic coordinates of the robot at the inlet position and cooperating with the inertial measurement unit to obtain geographic coordinates of the robot in the pipeline, so as to complete the precise positioning of the robot;

the camera modules are circumferentially arranged above the control box, the cameras and the illumination light sources are arranged side by side, and the ground terminal controller adjusts the camera modules through the mobile terminal controller, that is, the cameras and the illumination light sources synchronously rotate in the horizontal and vertical directions on the platforms through fine-tuning rods; and the sonar is arranged below the control box through a lifting mechanism, and the ground terminal controller adjusts the position of the sonar through the mobile terminal controller, that is, the sonar is retracted or lowered through the lifting mechanism.

Further, in the amphibious robot for in-service inspection of drainage pipelines, a main support and a hull frame are arranged below the control box, and the floating bodies are connected with the structure conversion module through the main support; the structure conversion module includes stepping motors, telescopic frames and telescopic cross bars, where the telescopic frames are arranged on the main support, and the stepping motors control the telescopic frames to fold or extend through the telescopic cross bars; when the telescopic frames are folded, the structure conversion module drives the robot body to be converted into the ship-like working mode; and when the telescopic frames are extended, the structure conversion module drives the robot body to be converted into the car-like working mode.

Further, in the amphibious robot for in-service inspection of drainage pipelines, the control box is placed on the top side of the main support through the hull frame, the telescopic frames are placed on the bottom side of the main support, and the floating bodies are placed on the main support through the telescopic cross bars;

the ends of the main support are provided with horizontal telescopic grooves, one end of each telescopic cross bar is placed in the telescopic groove, and the other end of the telescopic cross bar is connected with the floating body; the telescopic grooves are provided with guide grooves arranged along a lengthwise direction, and the ends of the telescopic frames are connected with the telescopic cross bars through the guide grooves. The stepping motors control the telescopic cross bars to move horizontally in the telescopic grooves, that is, the top ends of the telescopic frames move horizontally along the guide grooves along with the telescopic movement of the telescopic cross bars; and the telescopic frames are a cross-hinged scissors-type telescopic mechanism; when the top ends of the telescopic frames are driven by the telescopic cross bars to move outwards relatively, the telescopic frames are cross-folded, so that the control box moves down horizontally and is converted into the ship-like working mode; and when the top ends of the telescopic frames are driven by the telescopic cross bars to move inwards relatively, the telescopic frames are cross-extended, so that the control box moves up horizontally and is converted into the car-like working mode.

Further, in the amphibious robot for in-service inspection of drainage pipelines, the car-like propulsion module includes underwater electric wheels and an electric wheel controller, and the robot realizes the steering function through a rotational speed difference between the left and right underwater electric wheels; the electric wheel controller is in control connection with the underwater electric wheels, and the mobile terminal controller is in control connection with the electric wheel controller; and the underwater electric wheels are arranged at the bottom ends of the telescopic frames.

Further, in the amphibious robot for in-service inspection of drainage pipelines, the ship-like propulsion module includes underwater propellers and a propeller controller, and the robot realizes the steering function through a rotational speed difference between the left and right underwater propellers; the underwater propellers are in control connection with the propeller controller, and the mobile terminal controller is in control connection with the propeller controller; the underwater propellers are fixed on the floating bodies.

The disclosure also provides a control method of the amphibious robot for in-service inspection of drainage pipelines. Adopting the amphibious robot for in-service inspection of drainage pipelines, the control method includes the following steps:

S1, putting the robot into the pipeline from an inlet position, starting the robot and completing initializations of corresponding modules, and proceeding to S2;

S2, turning on the communication between the ground terminal controller and the robot, where the mobile terminal controller collects environmental information in the pipeline through the detection module, and proceeding to S3 when the ground terminal controller receives picture information transmitted by the mobile terminal controller;

S3, checking the environmental state in the pipeline through the display screen of the ground terminal controller, and determining the working mode for the robot;

in the event of no water or a shallow water level in the pipeline, switching to S4; and in the event of a moderate or high water level in the pipeline, switching to S5;

S4, remaining unchanged if the robot is originally in a car-like working mode;

converting the robot into the car-like working mode through a structure conversion module if the robot is originally in a ship-like working mode; and
at the same time, retracting the sonar of the detection module, and proceeding to S6;

S5, remaining unchanged if the robot is originally in the ship-like working mode;
converting the robot into the ship-like working mode through the structure conversion module if the robot is originally in the car-like working mode;
at the same time, stretching out the sonar of the detection module, and proceeding to the S6;

S6: the robot entering the working state, controlling the robot to move by the propulsion module, and the mobile terminal controller collecting and storing high-definition images of the environment above water in the pipeline through camera modules, and the mobile terminal controller collecting and storing sonar images of underwater environment in the pipeline through the sonar, and transmitting both the high-definition images and the sonar images to the ground terminal controller;
proceeding to S3 if the work continues;
proceeding to S7 if the work ends;

S7: sending an instruction to the mobile terminal controller through the ground terminal controller to control the robot to move to the inlet position, taking the robot back to the ground, disconnecting the communication between the ground terminal controller and the robot, and manually turning off the power module to complete the whole detection work.

Further, in the control method of the amphibious robot for in-service inspection of drainage pipelines, in the S3, three operation modes below are adopted when determining the working mode for the robot:
(1) manual remote control: the operator makes a decision according to the environmental information and state information of the robot received by the ground terminal controller and sent by the mobile terminal controller, and gives instructions through the operating handle;
(2) full autonomous control of the system: the mobile terminal controller autonomously makes judgments and gives instructions through the data interface according to the environmental information and the robot state information collected by the detection module; and
(3) semi-autonomous control of the system under manual monitoring: the monitoring personnel monitor the whole process through the ground terminal controller, and the mobile terminal controller takes a main role to autonomously make judgments and give instructions through the data interface according to the environmental information and the state information of the robot collected by the detection module; but a manual intervention is carried out when necessary, and the instructions are issued directly through the operating handle, and the instructions issued by the operating handle have higher priority than the instructions autonomously made by the system;

in the S4, when the robot is converted from the ship-like working mode to the car-like working mode, the telescopic cross bars are controlled by the stepping motors to retract, and the floating bodies are driven to retract inwards, and at the same time the telescopic frames are driven to be lowered in an extended state; and
in the S5, when the robot is converted from the car-like working mode to the ship-like working mode, the telescopic cross bars are controlled by the stepping motors to extend, and the floating bodies are driven to extend outwards, so that the telescopic frames are folded into a folded state.

Compared with the prior art, the disclosure has following beneficial effects:
1) The amphibious robot for in-service inspection of drainage pipelines and the control method of the present disclosure solve the problem of inconvenience to production and life caused by the need to shut off water during pipeline inspection in the past, and may realize the all-water-level drainage pipeline inspection by using the robot. In shallow water or waterless areas, the robot works with a car-like structure, and in deep water areas, the robot works with a ship-like structure. The amphibious pipeline robot provided by the disclosure may meet the requirements of complex environments of different pipelines, and is different from a single car-like or ship-like robot to be launched according to the requirement of different water areas, so that the working efficiency is obviously improved; the robot may adapt to the drainage pipeline environment and complete the inspection of the pipeline interior in different environments. The flexible mode switching of the structure enables the robot to adapt to the environment with varying water depth such as culverts and pipelines, enhancing the practicability;
2) based on the detection module carried by the robot, the disclosure may obtain the environmental information and position information in real time, and is convenient for workers to mark the position of pipeline defects. In the prior art, the towing cable is used for communication, and positioning is carried out by measuring the length of the towing cable, but the work of the robot is restricted, and the relaxation and bending of the towing cable affect the positioning accuracy of the detection equipment. By adopting the wireless communication and the inertial measurement unit for positioning, the disclosure avoids the winding of the towing cable, reduces the driving resistance and improves the positioning accuracy; and
3) the amphibious robot for in-service inspection of drainage pipelines and the control method of the disclosure may carry out structure conversion in time, and the sonar also flexibly stretches out and retracts with the structure conversion process, and the front, rear, left and right cameras are all zoom cameras rotatable in the horizontal and vertical directions, so that ultra-high definition panoramic images in the pipeline may be obtained through the mosaicking and fusion of multi-camera images; at the same time, more comprehensive and clearer pipeline status information may be obtained, thus facilitating the detection and identification of defects in the pipeline.

DETAILED DESCRIPTION OF THE EMBODIMENTS

Hereinafter, an amphibious robot for in-service inspection of drainage pipelines and a control method of the present disclosure are described in more detail with reference to the attached drawings, a preferred embodiment of the present disclosure is shown, and it should be understood that those skilled in the art may modify the disclosure described here and still achieve the beneficial effects of the present disclosure. Therefore, the following description should be understood as extensive knowledge to those skilled in the art, and not as a limitation of the present disclosure.

In the description of the disclosure, it needs to be stated that, directional words, such as terms "center", "transverse", "longitudinal", "length", "width", "thickness", "upper", "lower", "front", "rear", "left", "right", "vertical", "horizontal", "top", "bottom", "inside" and "outside", "clockwise" and "anticlockwise" instruct the orientation and position relationship based on the location or position shown in the attached drawings, merely to facilitate the description and simplification of the disclosure, and not to indicate or imply that the device or element referred to must have a particular orientation, construction and operation in a particular orientation, shall not be construed as limiting the specific scope of protection of the disclosure.

In addition, the terms "first" and "second", if any, are only used for descriptive purposes and cannot be understood as indicating or implying relative importance or implicitly indicating the number of technical features. Therefore, features defined as "first" and "second" may include one or more of these features explicitly or implicitly. In the description of the present disclosure, "at least" means one or more, unless otherwise specifically defined.

In the present disclosure, unless otherwise specified and limited, the terms "assembly", "connect" and "link" should be understood in a broad sense, for example, the terms may denote fixed connections, removable connections, or integrated connections; the terms may also refer to mechanical connections; the terms may also represent direct connections, connections through an intermediary, or internal connections between two components. For those skilled in the art, the specific meanings of the above terms in the present disclosure may be understood according to specific situations.

In following paragraphs, the disclosure is described in more detail by way of examples with reference to the attached drawings. Advantages and features of the present disclosure become more apparent from follow descriptions. It should be noted that all the attached drawings are in a very simplified form and use inaccurate proportions, and are only used to facilitate and clearly illustrate the embodiment of the present disclosure.

Figure 1:
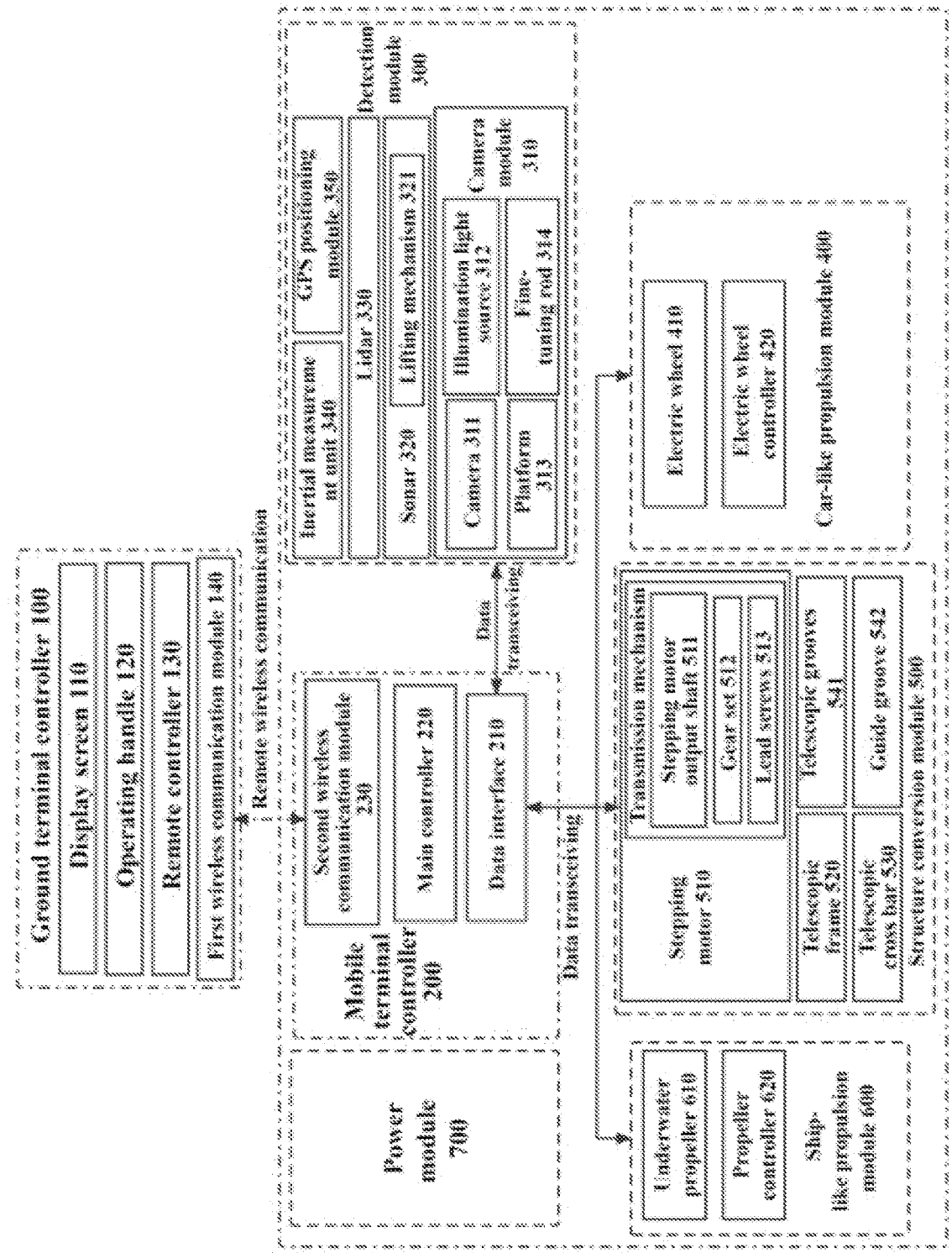
FIG. 1 is a schematic diagram of connections between modules of the amphibious robot for in-service inspection of drainage pipelines in the present disclosure.
Figure 2:
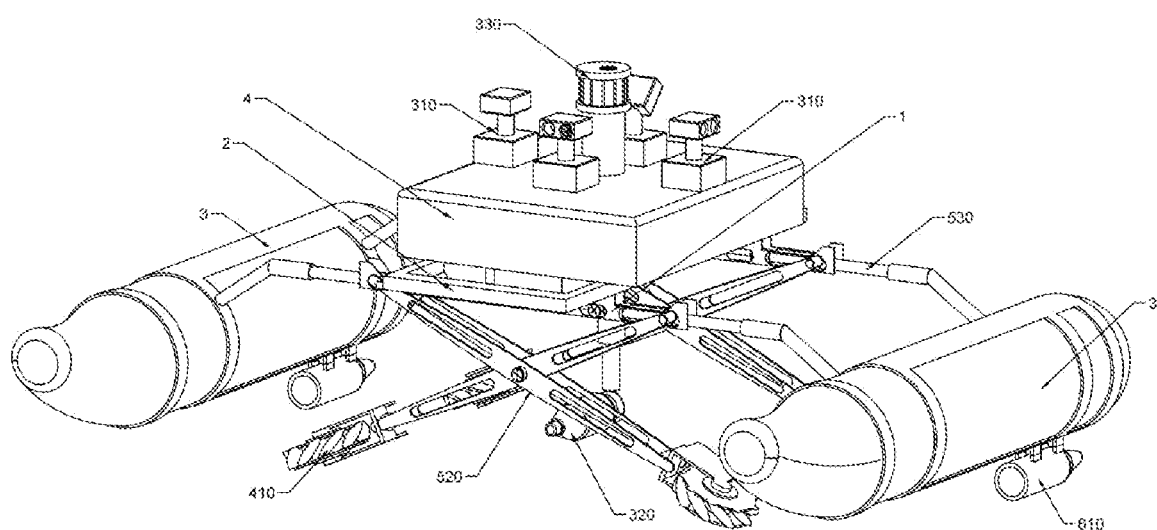
FIG. 2 is a three-dimensional structure diagram of the amphibious robot for in-service inspection of drainage pipelines in the present disclosure.
Figure 3:
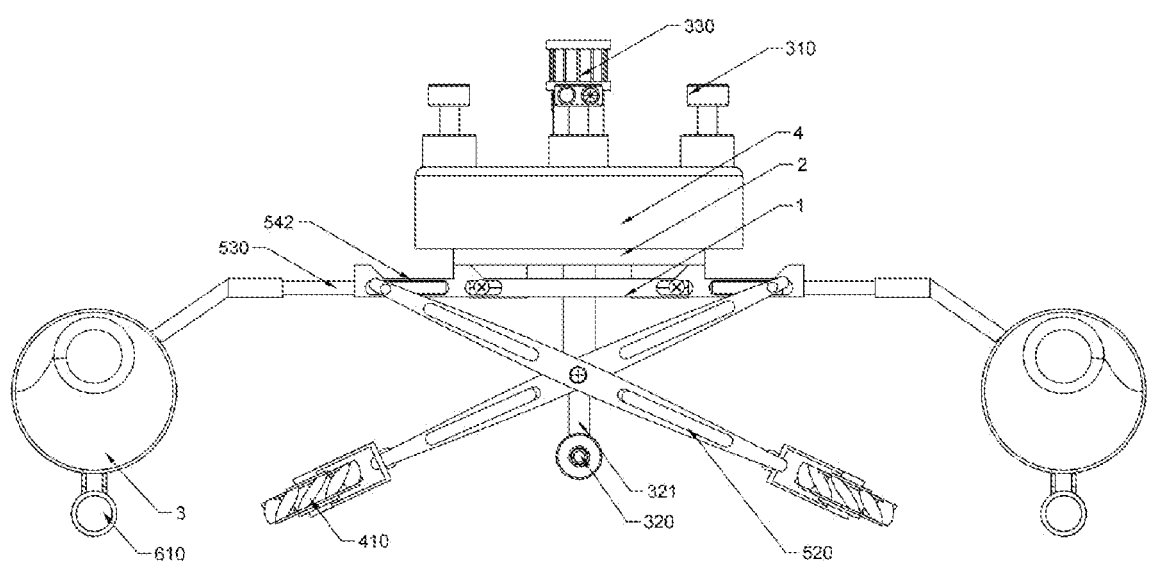
FIG. 3 is a schematic front view of FIG. 2.
Figure 4:
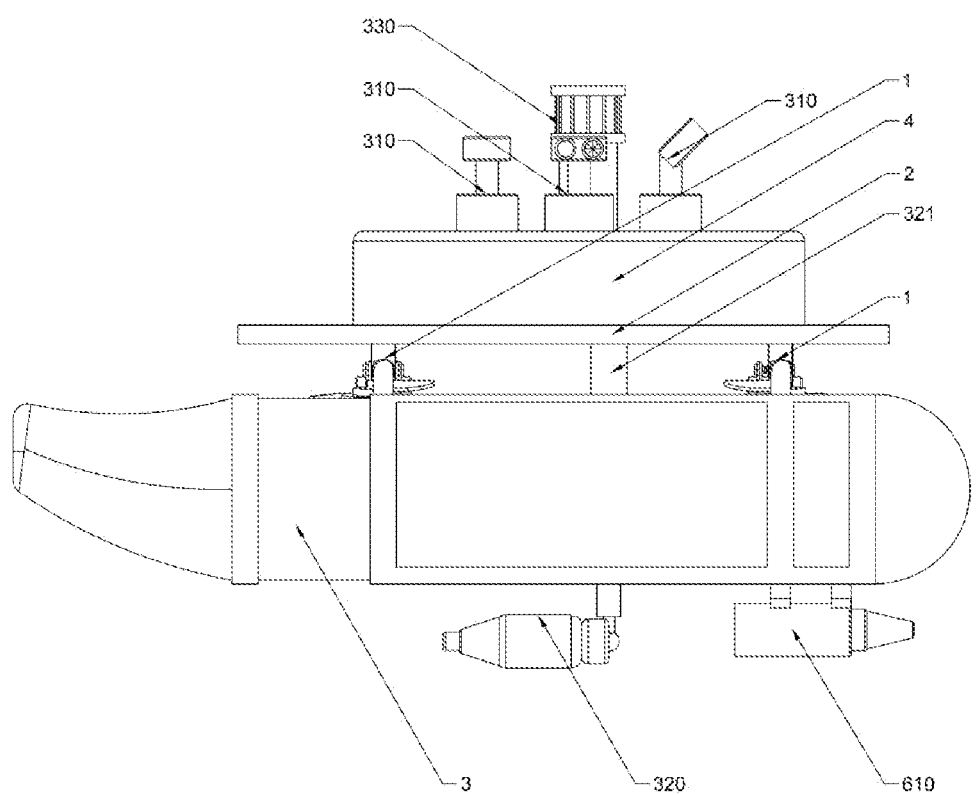
FIG. 4 is a schematic side view of FIG. 2.
Figure 5:
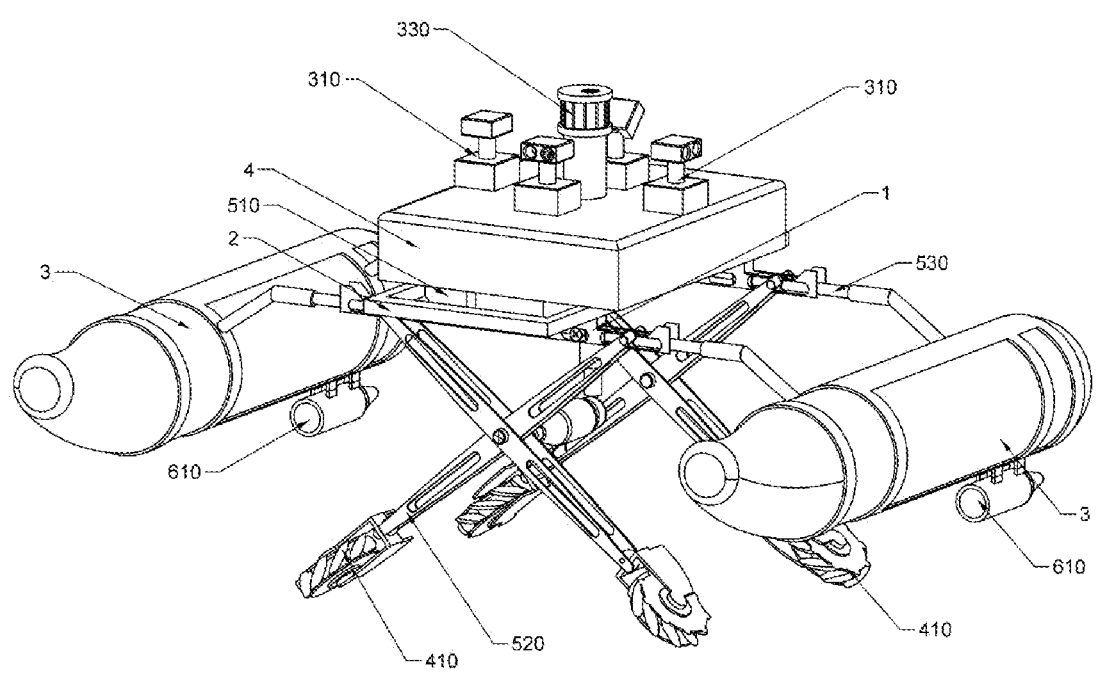
FIG. 5 is a three-dimensional structure diagram of the amphibious robot for in-service inspection of drainage pipelines in the car-like working mode in the present disclosure.
Figure 6:
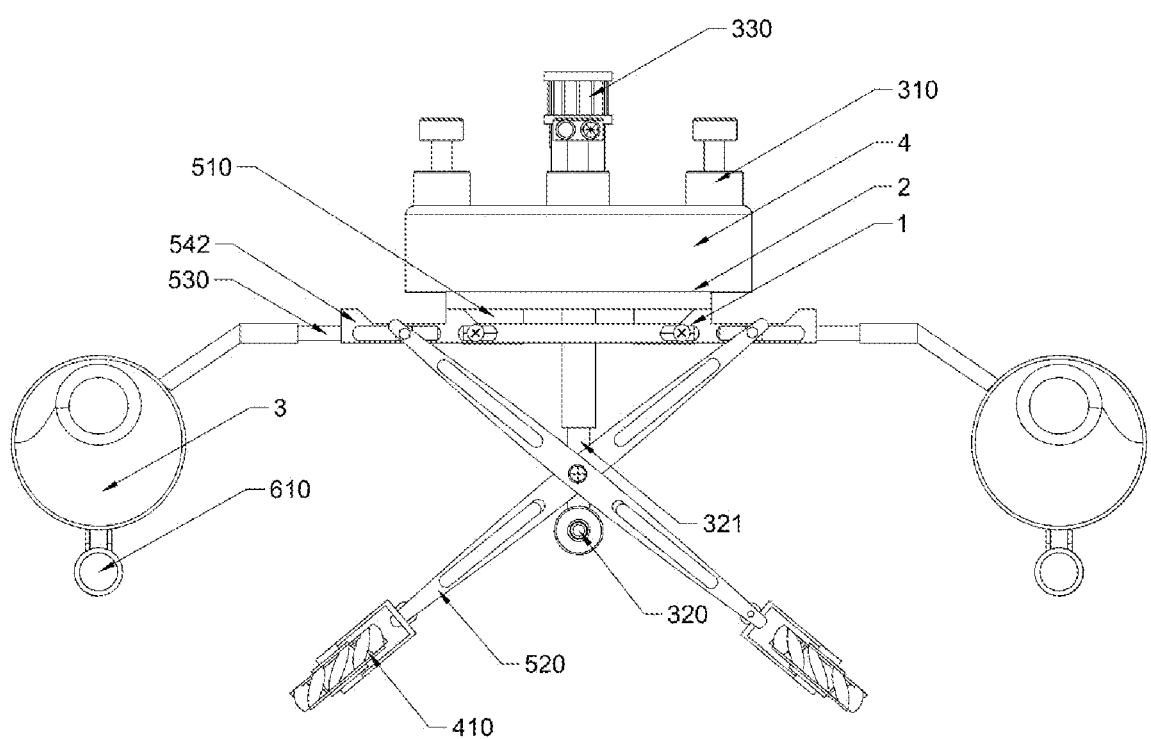
FIG. 6 is a schematic front view of FIG. 5.
Figure 7:
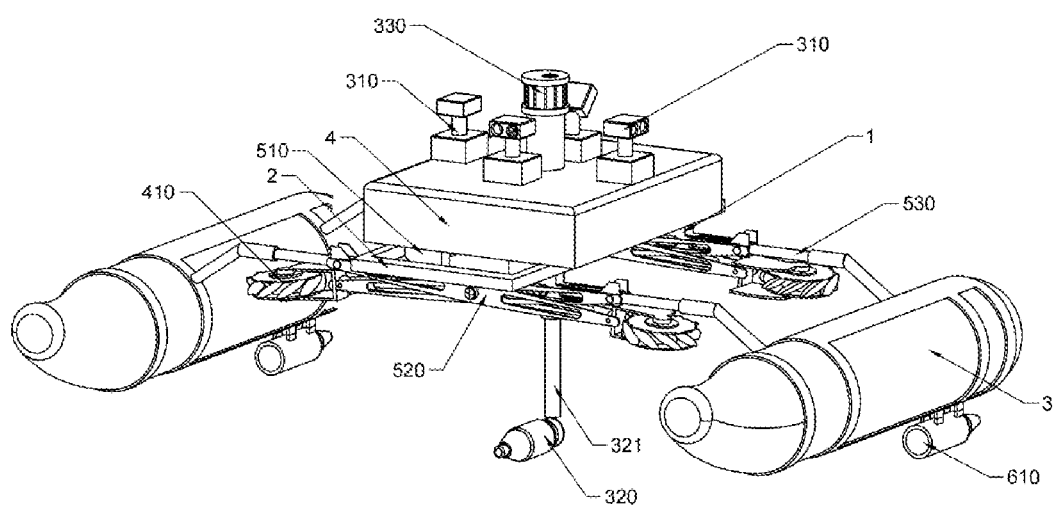
FIG. 7 is a three-dimensional structure diagram of the amphibious robot for in-service inspection of drainage pipelines in the ship-like working mode in the present disclosure.
Figure 8:
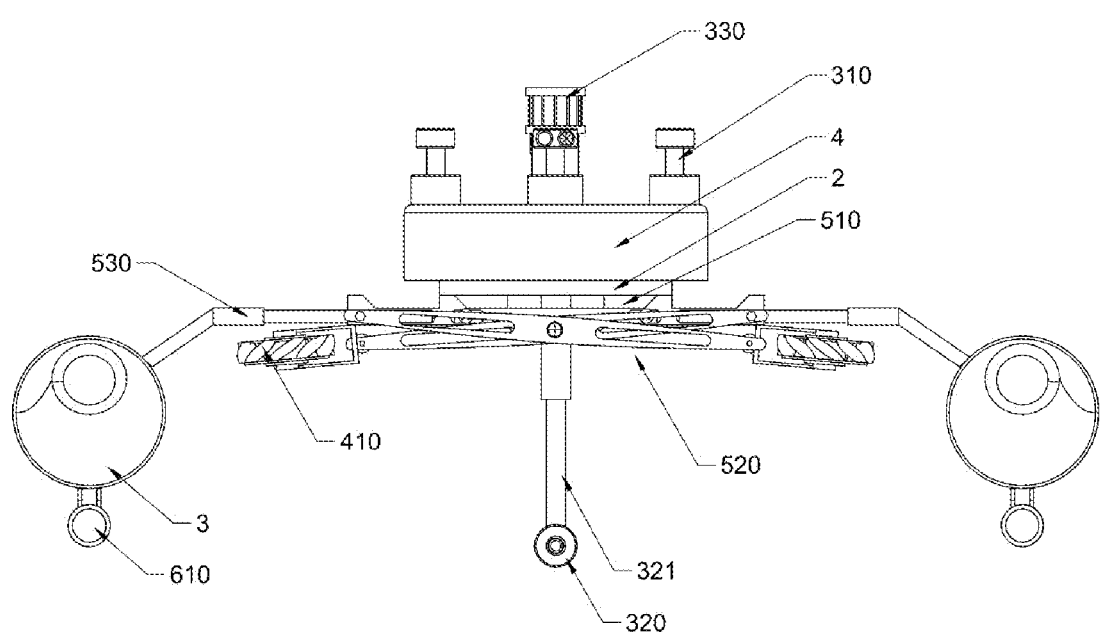
FIG. 8 is a schematic front view of FIG. 7.

As shown in FIG. 1, the disclosure provides an amphibious robot for in-service inspection of drainage pipelines, including a robot body, a detection module 300, a propulsion module, a structure conversion module 500, a ground terminal controller 100, a mobile terminal controller 200 and a power module 700.

as shown in FIG. 2, FIG. 3 and FIG. 4, the robot body, as a carrier of modules, includes a control box 4 and floating bodies 3. The sealed control box 4 is internally loaded with the mobile terminal controller 200 and the power module 700. The bottom side of the control box 4 is provided with a main support 1 and a hull frame 2. The main support 1 is a core bracket for fixing the control box 4 and connecting with other modules. The control box 4 is placed on the top side of the main support 1 through the hull frame 2, and the floating bodies 3 are connected with a structure conversion module 500 through the main support 1, and the floating bodies 3 provide buoyancy for the robot.

The detection module 300 is used for collecting environmental information and navigation information of the robot in the pipeline during the working process, including pipeline environment, pipeline wall image, water level depth, current position, current orientation, etc., so as to determine the position information and environmental state of the robot in the pipeline, thus performing an accurate localization;

the propulsion module is used for controlling the movement of the robot, driving the robot to move forward and turn, and the propulsion module includes a car-like propulsion module 400 and a ship-like propulsion module 600;

the structure conversion module 500 is used for controlling the robot to switch between structures of a car-like working mode and a ship-like working mode; that is, the structure conversion module 500 is connected with the car-like propulsion module 400 and the ship-like propulsion module 600;

the ground terminal controller 100 is used for information integration and instruction transmission, and the ground terminal controller 100 is connected with the mobile terminal controller 200 by signal, that is, the ground terminal controller 100 receives the environmental information and robot pose information collected by the detection module 300 through the mobile terminal controller 200, and the operator monitors the robot and sends corresponding control instructions to the robot according to the information. That is, the ground terminal controller 100 sends a structure conversion instruction to the structure conversion module 500 and/or sends a propulsion instruction to the propulsion module through the mobile terminal controller 200, so as to indirectly remotely control the working state of the robot;

the mobile terminal controller 200 is used for receiving and transmitting the information collected by the detection module 300, and the mobile terminal controller 200 is also used for receiving the instructions transmitted by the ground terminal controller 100, and controlling action and structure switching of the robot through the propulsion module and the structure conversion module 500 respectively, that is, the mobile terminal controller 200 is in signal connection with the detection module 300 and the ground terminal controller 100, and the mobile terminal controller 200 is connected with the structure conversion module 500, the car-like propulsion module 400 and the ship-like propulsion module 600, thus realizing the direct control of robot work. At the same time, the environmental information and robot pose information collected by the detection module 300 are also used as input information for autonomous control of the robot, and the mobile terminal controller 200 makes decisions autonomously and issues instructions through the data interface 210 to directly control the working state of the robot; and the power module 700 is used for supplying power to the whole robot and various elements.

Further, as shown in FIG. 1, the ground terminal controller 100 includes a display screen 110, an operating handle 120, a remote controller 130 and a first wireless communication module 140, where the display screen 110 is used for visualizing the pose information and environmental state detected by the detection module 300 in the working process;

the operating handle 120 is used for sending a structure conversion instruction and a propulsion instruction for controlling the robot, so as to control the structure conversion, the moving direction and the movement speed of the robot;

the remote controller 130 is used for remotely monitoring the environmental information and pose information of the robot at the ground terminal and making robot action decisions; and the first wireless communication module 140 is used for transceiving remote data of the ground terminal controller 100; the operator sends the structure conversion instruction and the propulsion instruction transmitted by the ground terminal controller 100 to the mobile terminal controller 200 of the robot, and the operator may also receive the environmental information converted and transmitted by the mobile terminal controller 200, that is, the first wireless communication module 140 is in signal connection with the mobile terminal controller 200.

Further, as shown in FIG. 1, the mobile terminal controller 200 includes a data interface 210, a main controller 220 and a second wireless communication module 230, where the data interface 210 includes AD interfaces, serial communication interfaces, USB interfaces and network interfaces; the data interface 210 is in signal connection with the detection module 300 for communication between the mobile terminal controller 200 and the detection module 300, the structure conversion module 500 and the propulsion module;

the main controller 220 controls the structure conversion module 500, the car-like propulsion module 400 and the ship-like propulsion module 600 to perform corresponding operations according to the structure conversion instruction and the propulsion instruction sent by the ground terminal controller 100;

the second wireless communication module 230 is used for remote data transceiving of the mobile terminal controller 200, receiving the structure conversion instruction and the propulsion instruction transmitted by the ground terminal controller 100, and transmitting the environmental information and the pose information collected by the detection module 300 to the ground terminal controller 100 through the data interface 210, that is, the second wireless communication module 230 is in signal connection with the remote controller 130 of the ground terminal controller 100.

Specifically, the first wireless communication module 140 is in signal connection with the second wireless communication module 230, and bidirectional data transmission and instruction transceiving are performed between the first wireless communication module 140 and the second wireless communication module 230.

Figure 14:
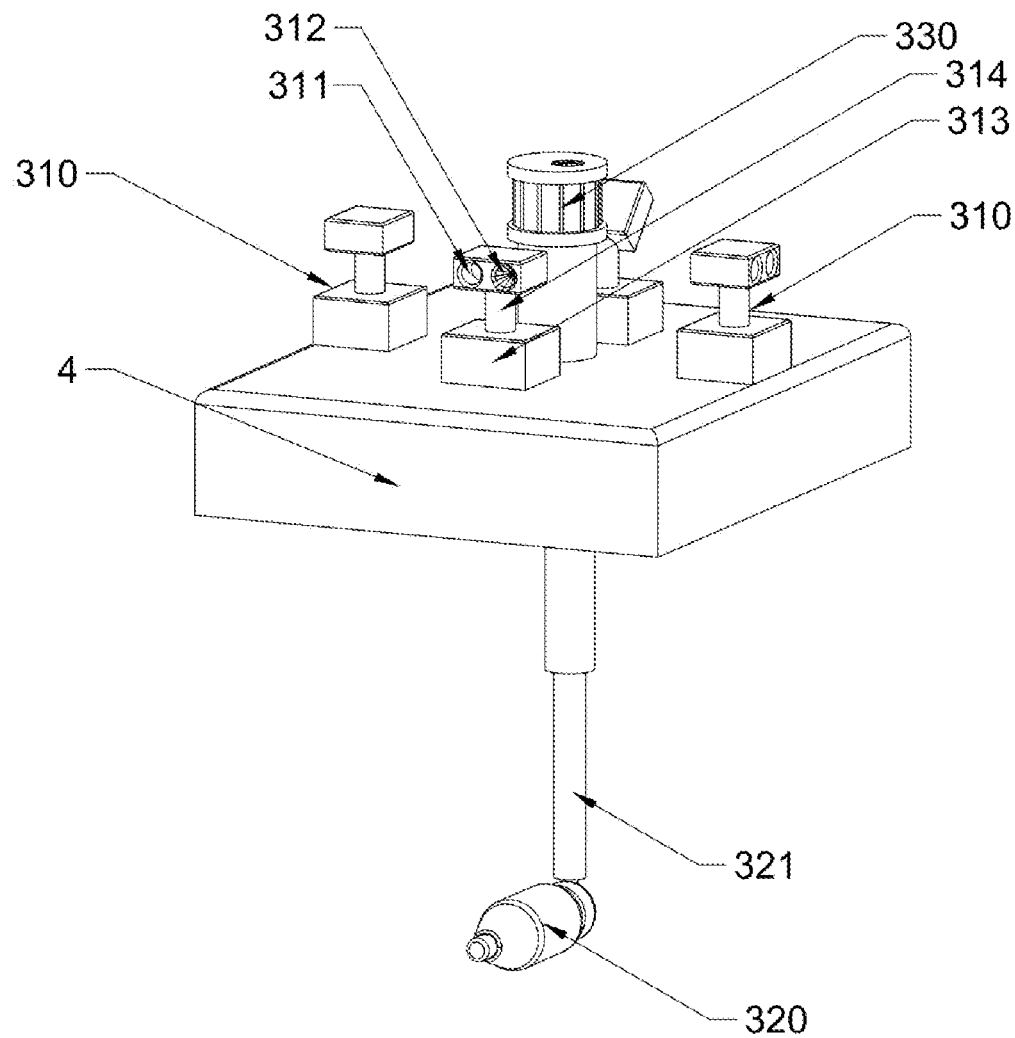
FIG. 14 is a three-dimensional structure diagram of the detection module in the present disclosure.
Figure 15:
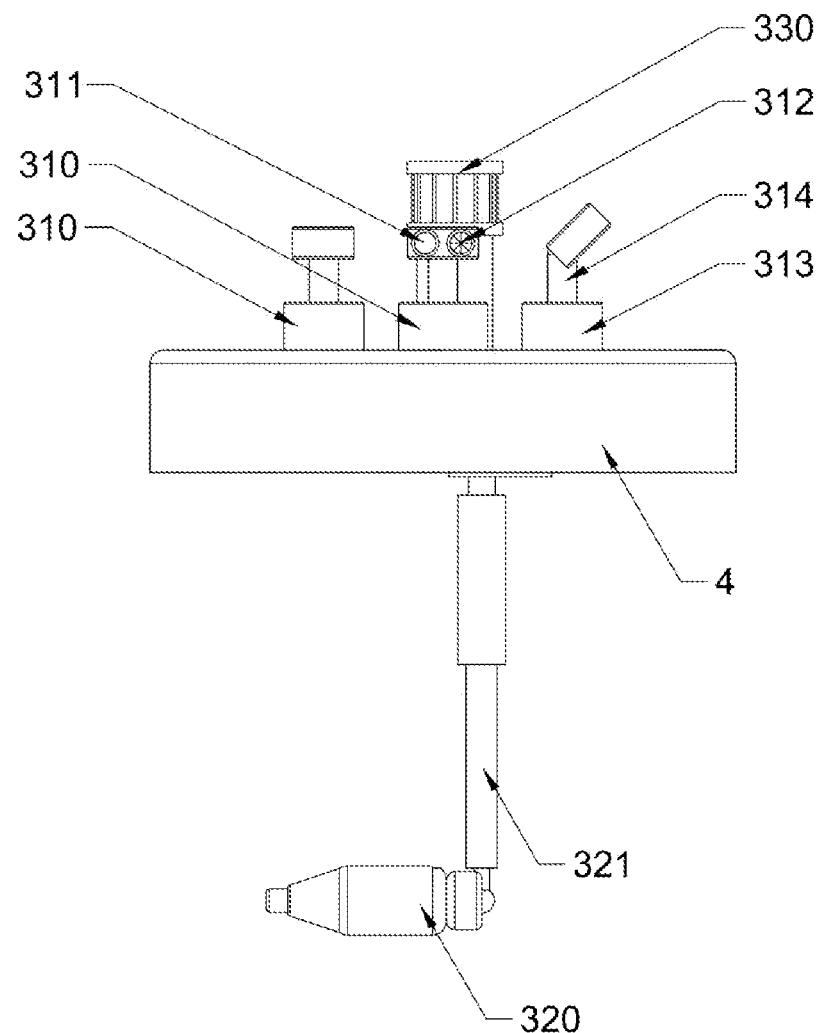
FIG. 15 is a schematic side view of FIG. 14.
Figure 16:
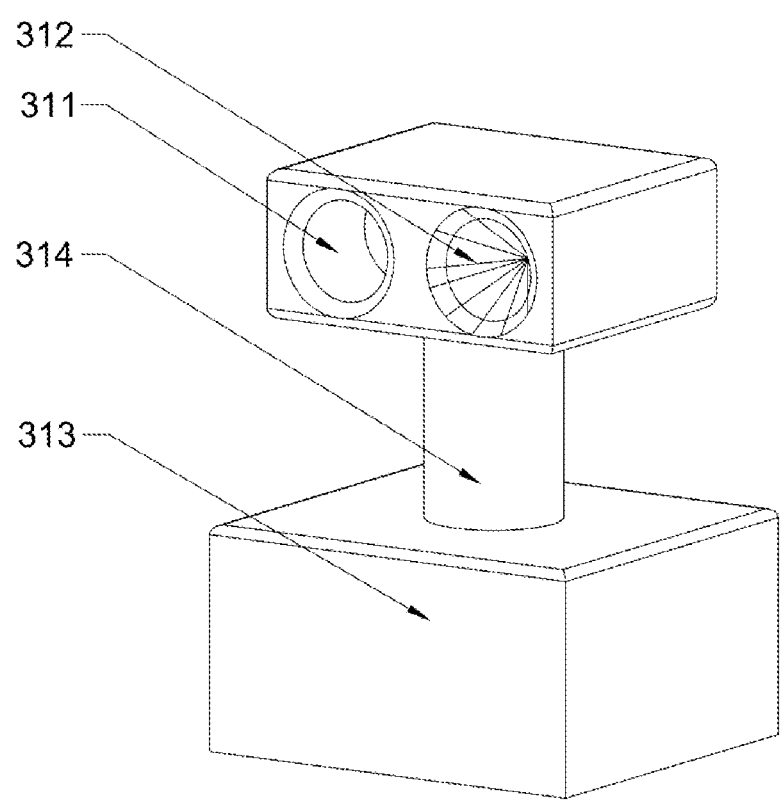
FIG. 16 is a schematic structure diagram of camera modules in FIG. 14.

Further, as shown in FIG. 1, FIG. 2, FIG. 3, and FIG. 4, the detection module 300 includes camera modules 310 installed on the control box 4, a sonar 320 installed below the control box 4, a lidar 330 installed on the control box 4, an inertial measurement unit 340 installed in the control box 4 and a GPS positioning module 350 installed in the control box 4, where as shown in FIG. 14, FIG. 15 and FIG. 16, the camera modules 310 include cameras 311, illumination light sources 312 and platforms 313, the cameras 311 and the illumination light sources 312 are installed on the platforms 313; the camera modules 310 are arranged circumferentially around the control box 4, and at least one camera module 310 is arranged in each of the four directions of the control box 4; the cameras 311 and the illumination light sources 312 are arranged side by side, the cameras 311 and the illumination light sources 312 are set on the platforms 313 through fine-tuning rods 314; at the same time, the ground terminal controller 100 may adjust the camera modules 310 through the mobile terminal controller 200, and the cameras 311 and the illumination light sources 312 synchronously rotate horizontally and vertically on the platforms 313 through the fine-tuning rods 314. Therefore, the environmental information around the robot may be collected in all directions, and different angles are conveniently adjusted to according to the water depth, so as to collect panoramic high-resolution images. Moreover, the cameras 311 may be zoomed by remote control, and the details may be enlarged for observation after discovering the defects of the pipeline.

As shown in FIG. 14 and FIG. 15, the sonar 320 is used for detecting the water depth and underwater environment in the pipeline. The sonar 320 is arranged below the control box 4 through a lifting mechanism 321. Since the distance between the robot in the pipeline and the bottom of water varies with the different mode structures adopted by the robot, the ground terminal controller 100 adjusts the position of the sonar 320 through the mobile terminal controller 200, that is, the sonar 320 is retracted or lowered through the lifting mechanism 321.

The lidar 330 is used for sensing the environment above the water surface in the pipeline and cooperating to complete the inspection of the pipeline wall and positioning;

the inertial measurement unit 340 is used for sensing the position information and the orientation information of the robot; and the GPS positioning module 350 is used for obtaining the geographic coordinates of the robot at the inlet position, and cooperating with other sensors such as the inertial measurement unit 340 to obtain the geographic coordinates of the robot in the pipeline, so as to complete the precise positioning of the robot.

Further, as shown in FIG. 5, FIG. 6, FIG. 7 and FIG. 8, the structure conversion module 500 includes stepping motors 510, telescopic frames 520 and telescopic cross bars 530, where the telescopic frames 520 are arranged at the bottom side of the main support 1, and the floating bodies 3 are symmetrically arranged at the left and right sides of the main support 1 through the telescopic cross bars 530, and the stepping motors 510 control the telescopic frames 520 to perform folding or stretching actions through the telescopic cross bars 530.

As shown in FIG. 9, FIG. 10, FIG. 11 and FIG. 12, the ends of the main support 1 are provided with horizontal telescopic grooves 541, one end of each telescopic cross bar 530 is placed in the telescopic grooves 541, and the other end of the telescopic cross bar is connected with the floating body 3. In the process of structure conversion, the stability of the robot may be adjusted by controlling the positions of the floating bodies 3, so that the center of gravity of the ship-like structure is more stable. The telescopic grooves 541 are provided with guide grooves 542 arranged along the length direction, and the ends of the telescopic frames 520 are connected with the telescopic cross bars 530 through the guide grooves 542. The stepping motors 510 control the telescopic cross bars 530 to move horizontally in the telescopic grooves 541, and the top ends of the telescopic frames 520 move horizontally along the guide grooves 542 along with the telescopic movement of the telescopic cross bars 530. Because the telescopic frames 520 are cross-hinged scissors-type telescopic mechanisms, the telescopic process of the structure is stable and the mechanical structure is simple. Driven by the telescopic cross bars 530, the telescopic frames 520 are correspondingly folded or extended with the change of the distance between the telescopic cross bars 530.

Figure 13:
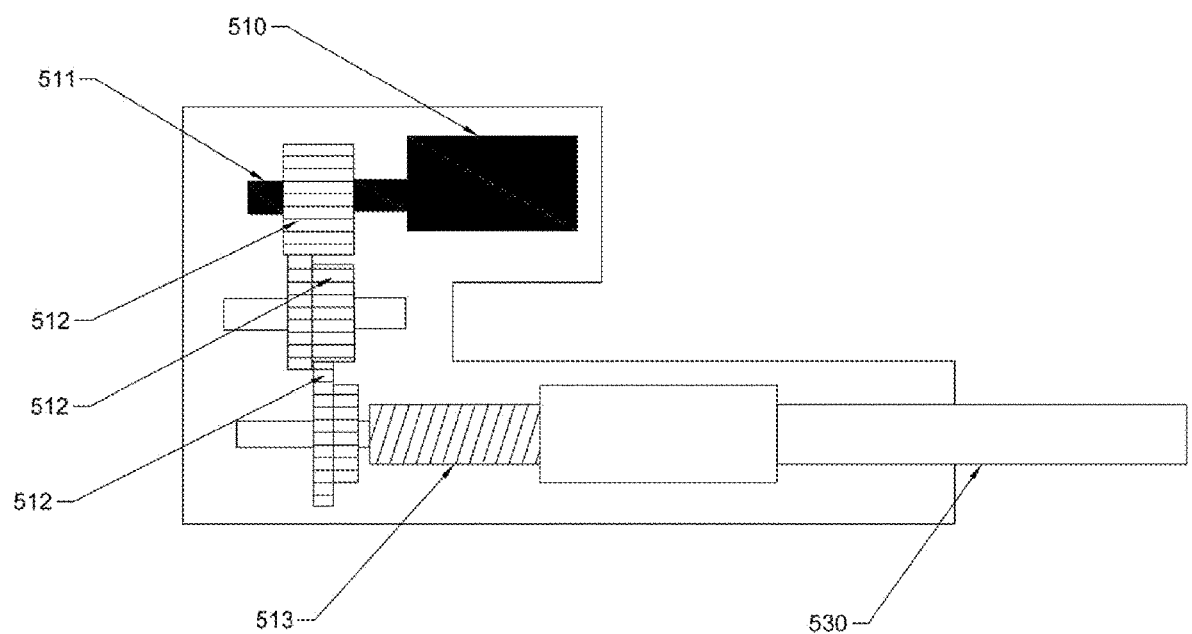
FIG. 13 is a schematic structure diagram of the transmission mechanism of the structure conversion module in an embodiment of the present disclosure.

Specifically, as shown in FIG. 13, the mobile terminal controller 200 controls the stepping motors 510 to work. As a driving unit, the stepping motors 510 provide mechanical power during attitude switching. The stepping motors 510 receive control pulses to generate angular displacement, and the stepping motors 510 control the horizontal telescopic movement of the telescopic cross bars 530 in the telescopic grooves 541 through transmission mechanisms, the transmission mechanisms include stepping motor output shafts 511, gear sets 512 and lead screws 513. That is, the stepping motor output shafts 511 of the stepping motors 510 drive the lead screws 513 to rotate through the gear sets 512, and the lead screws 513 are in threaded connection with the telescopic cross bars 530, the internal threads of the telescopic cross bars 530 are matched with the external threads of the lead screws 513, so that the telescopic cross bars 530 are driven to stretch out and retract, that is, the telescopic cross bars 530 horizontally stretch out and retract in the telescopic grooves 541 along with the rotation of the lead screws 513, so as to cooperate with the telescopic frames 520 to achieve up-and-down expansion and complete structure conversion. Since the stepping motors 510 generate angular displacement only when receiving pulses, the car-like posture or the ship-like posture may be well maintained when the posture conversion is completed, thus avoiding structural changes caused by vibration in the working process.

The stepping motors 510 are partially placed inside the control box 4 and connect with the main controller 220 and the power module 700 by signal.

Alternatively, hydraulic cylinders, air cylinders and other structures may be selected as driving units to drive the telescopic cross bars 530 to stretch out and retract.

As shown in FIG. 9, FIG. 10, FIG. 11 and FIG. 12, when the top ends of the telescopic frames 520 are driven by the telescopic cross bars 530 to move outwards relatively, that is, when the telescopic frames 520 are in a cross-folded shape, the telescopic frames 520 are retracted and placed at the bottom of the hull frame 2, and the structure conversion module 500 moves the control box 4 downwards and converts the robot into a ship-like working mode; when the top ends of the telescopic frames 520 are driven by the telescopic cross bars 530 to move inwards relatively, that is, the telescopic frames 520 are in a cross-extended shape, the robot may easily enter the car-like working state and work stably through the car-like propulsion module 400, and the structure conversion module 500 makes the control box 4 move up and convert the robot to the car-like working mode.

The whole folding structure of the structure conversion module 500 is simple and convenient to change, and the telescopic process is stable. The stepping motors 510 of the driving unit realizes stepless telescopic regulation through the match between the threads outside the lead screws 513 and the threads inside the telescopic cross bars 530, achieving different extending angles for the telescopic frames 520, thus meeting the needs of pipelines with different diameters.

Figure 9:
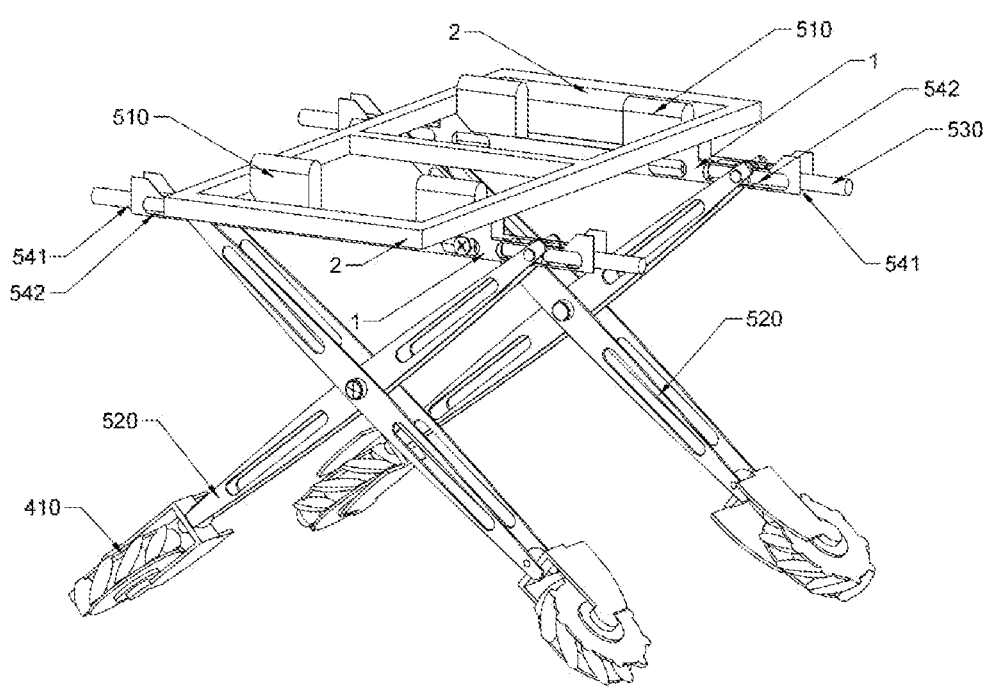
FIG. 9 is a three-dimensional structure diagram of the structure conversion module in the car-like working mode in the present disclosure.
Figure 10:
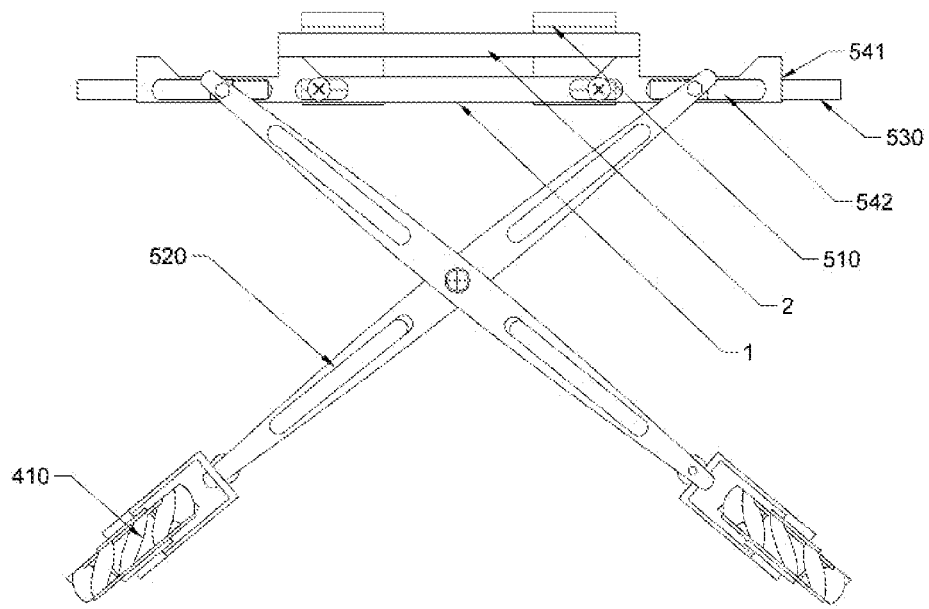
FIG. 10 is a schematic front view of FIG. 9.

Further, as shown in FIG. 9 and FIG. 10, the car-like propulsion module 400 includes underwater electric wheels 410 and an electric wheel controller 420, and the car-like propulsion module 400 realizes the propulsion of the robot in the car-like working mode through underwater electric wheels 410 with hub motors. There are underwater electric wheels 410 at the four bottom ends of the telescopic frames 520, and the robot realizes the steering function through a rotational speed difference between the left and right underwater electric wheels 410. The electric wheel controller 420 controls the hub motors to drive the underwater electric wheels 410, and the mobile terminal controller 200 is in control connection with the electric wheel controller 420, that is, the electric wheel controller 420 is controlled by the mobile terminal controller 200 through the data interface 210; since the underwater electric wheels 410 are arranged at the bottom ends of the telescopic frames 520, the cables of the underwater electric wheels 410 are connected to the control box 4 through a waterproof thin tube fixed on the telescopic frames 520, and the mobile terminal controller 200 in the control box 4 controls the car-like propulsion module 400, so as to enable the robot in the car-like working mode to move forward and backward, accelerate, decelerate and steer.

Figure 11:
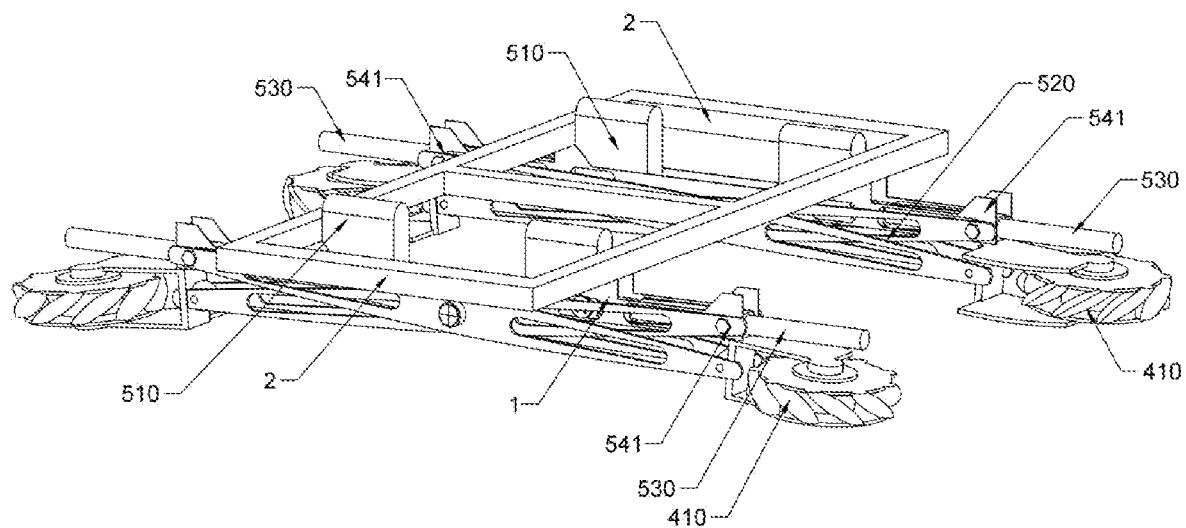
FIG. 11 is a three-dimensional structure diagram of the structure conversion module in the ship-like working mode in the present disclosure.
Figure 12:
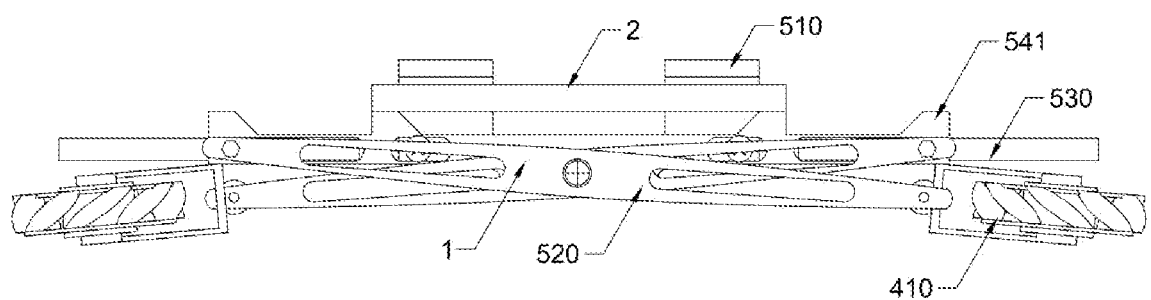
FIG. 12 is a schematic front view of FIG. 11.

Further, as shown in FIG. 11 and FIG. 12, the ship-like propulsion module 600 includes underwater propellers 610 and a propeller controller 620. The underwater propellers 610 are fixed on the bottom sides of the floating bodies 3 to provide the thrust needed for the movement of the robot in the ship-like working mode, and the robot realizes the steering function through a rotational speed difference between the left and right underwater propellers 610; the propeller controller 620 is in control connection with the underwater propellers 610, and the mobile terminal controller 200 is in control connection with the propeller controller 620, that is, the propeller controller is controlled by the mobile terminal controller 200 through the data interface 210; since the underwater propellers 610 are fixed on the floating bodies 3, the cables of the underwater propellers 610 are connected to the control box 4 through the waterproof thin tube fixed on the floating bodies 3 and the telescopic cross bars 530, and the mobile terminal controller 200 in the control box 4 controls the ship-like propulsion module 600, so as to enable the robot in the ship-like working mode to move forward and backward, accelerate, decelerate and steer.

Figure 17:
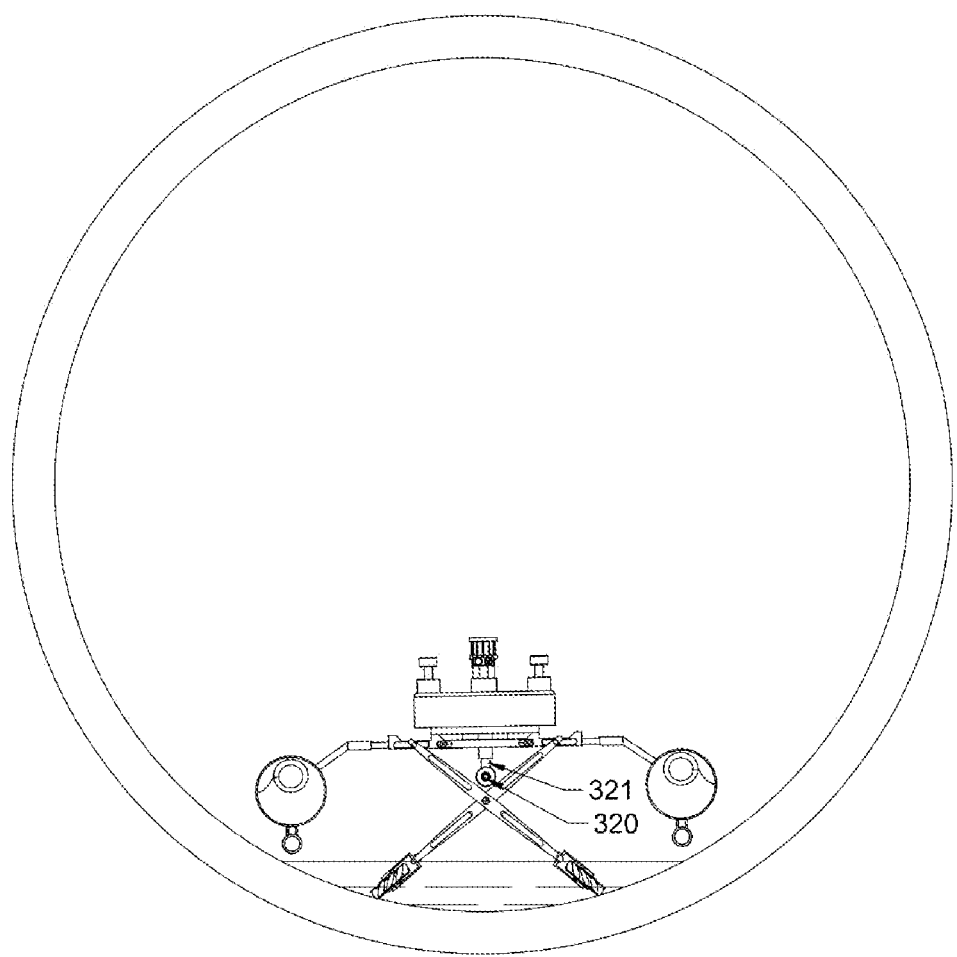
FIG. 17 is a three-dimensional structure diagram of the amphibious robot for in-service inspection of drainage pipelines in the car-like working mode under a shallow water environment in the present disclosure.
Figure 18:
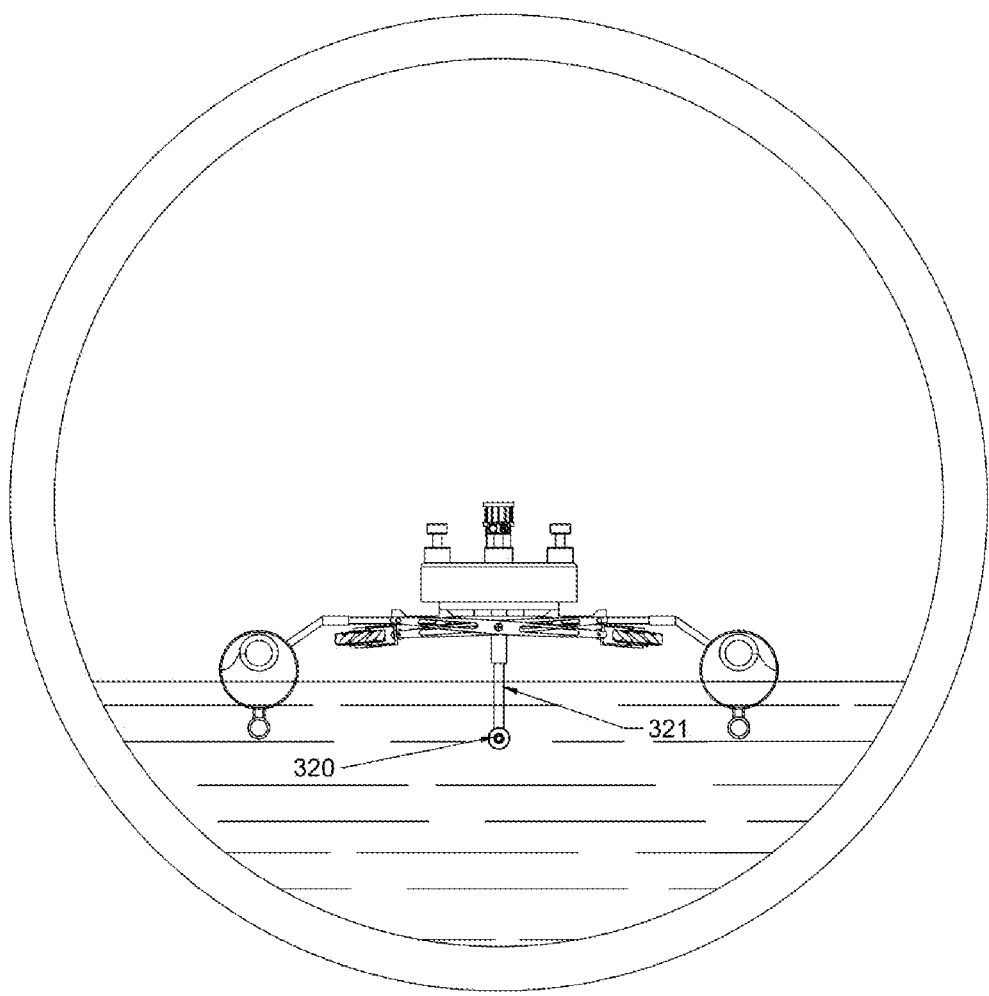
FIG. 18 is a three-dimensional structure diagram of the amphibious robot for in-service inspection of drainage pipelines in the ship-like working mode under a deep water environment in the present disclosure.
Figure 19:
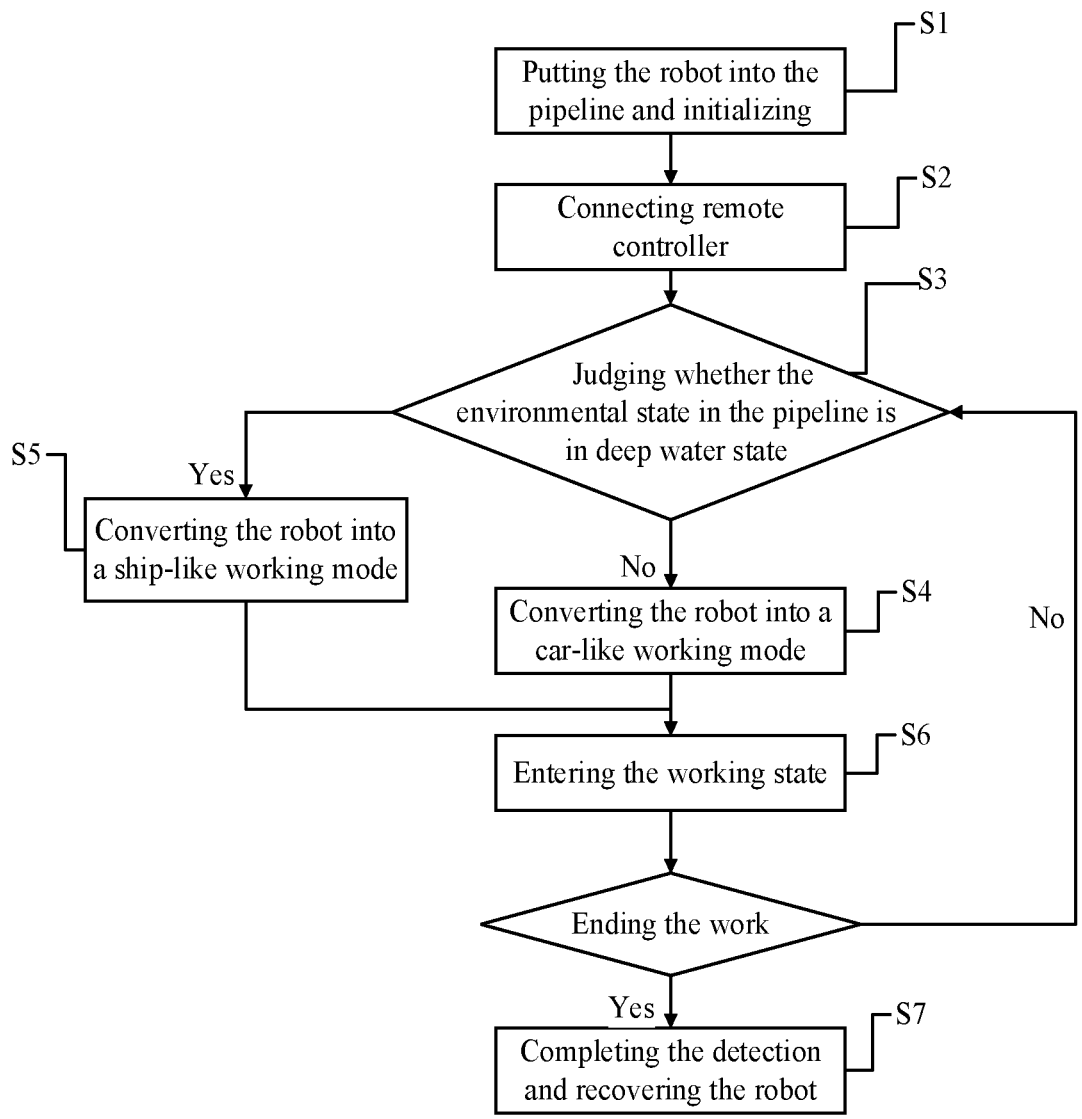
FIG. 19 is a workflow block diagram of a control method of the amphibious robot for in-service inspection of drainage pipelines in the present disclosure.

As shown in FIG. 19, the disclosure provides a control method of an amphibious robot for in-service inspection of drainage pipelines. Adopting the amphibious robot for in-service inspection of drainage pipelines, the control method includes the following steps:

S1, putting the robot into the pipeline from an inlet position, starting the robot and completing initializations of corresponding modules, and proceeding to S2;

S2, turning on the communication between the ground terminal controller 100 and the robot, turning on the communication between the first wireless communication module 140 of the ground terminal controller 100 and the second wireless communication module 230 of the mobile terminal controller 200, realizing control via remote communication through the wireless network. The mobile terminal controller 200 collects environmental information in the pipeline through a detection module 300; and proceeding to S3 when the ground terminal controller 100 receives picture information transmitted by the mobile terminal controller 200;

S3, checking the environmental state in the picture through the display screen 110 of the ground terminal controller 100, and determining the working mode required by the robot;

in the event of no water or a shallow water level in the pipeline, switching to S4; and in the event of a moderate or high water level in the pipeline, switching to S5;

the three operation modes of the robot to choose from are as follows:

1. manual remote control: the operator makes a decision according to the environmental information and the state information of the robot received by the ground terminal controller 100 and sent by the mobile terminal controller 200, and gives instructions through the operating handle 120;
2. full autonomous control of the system: the mobile terminal controller autonomously makes judgments and gives instructions through the data interface according to the environmental information and the robot's state information collected by the detection module; and
3. semi-autonomous control of the system under manual monitoring: the monitoring personnel monitor the whole process through the ground terminal controller 100, and the mobile terminal controller 200 takes the main role to autonomously make judgments and give instructions through the data interface 210 according to the environmental information and the state information of the robot collected by the detection module 300; but a manual intervention is carried out when necessary, and the instructions are issued directly through the operating handle 120, and the instructions issued by the operating handle 120 have higher priority than the instructions autonomously made by the system;

S4, remaining unchanged if the robot is originally in a car-like working mode;

converting the robot into the car-like working mode through a structure conversion module 500 if the robot is originally in a ship-like working mode, that is, after receiving the instruction from the ground terminal controller 100 through the stepping motors 510, the telescopic cross bars 530 are controlled to retract, and the floating bodies 3 are driven to recover inwards and move closer, and at the same time, the telescopic frames 520 are driven to be lowered in an extended state, that is, the telescopic frames 520 are rotated outwards from the original angle to form a car-like structure, so as to travel by wheels in the pipeline;

at the same time, the lifting mechanism 321 ascends, so that the sonar 320 of the detection module 300 is retracted, so as to avoid obstacles in the working process from affecting the working process of the car-like structure, as shown in FIG. 17, and proceeding to S6;

S5, remaining unchanged if the robot is originally in the ship-like working mode;

converting the robot into the ship-like working mode through the structure conversion module 500 if the robot is originally in the car-like working mode, that is, the telescopic cross bars 530 are controlled by the stepping motors 510 to extend, the floating bodies 3 are driven to extend outwards, so that the telescopic frames 520 are folded into a folded state, that is, the telescopic frames 520 are rotated inwards to recover, forming a ship-like structure to sail in the pipeline;

at the same time, the lifting mechanism 321 descends to lower the sonar 320 of the detection module 300, as shown in FIG. 18, and the process goes to S6;

S6: the robot entering the working state, controlling the robot to move by the propulsion module, and mobile terminal controller collecting and storing high-definition images and data of environment above water in the pipeline by the mobile terminal controller 200 through camera modules 310 and lidar 330, and mobile terminal controller collecting and storing sonar images of underwater environment in the pipeline by the mobile terminal controller 200 through the sonar 320, and transmitting the high-definition images, lidar data and the sonar images to the ground terminal controller 100;

proceeding to S3 if the work continues;

proceeding to S7 if the work ends;

S7: sending an instruction to the mobile terminal controller 200 through the ground terminal controller 100 to control the robot to move to the inlet position, taking the robot back to the ground, disconnecting the communication between the ground terminal controller 100 and the robot, and manually turning off the power module 700 to complete the whole inspection work.

To sum up, in this embodiment, an amphibious robot for in-service inspection of drainage pipelines and its control method have following advantages:

1) The amphibious robot for in-service inspection of drainage pipelines and its control method of the present disclosure solve the problem of inconvenience caused to production and life by the need to shut off water during pipeline detection in the past, and may realize the all-water-level drainage pipeline inspection by using the robot. In shallow water or waterless areas, the robot works with a car-like structure, and in deep water areas, the robot works with a ship-like structure. The amphibious pipeline robot provided by the disclosure may meet the requirements of complex environments of different pipelines, and is different from a single car-like or ship-like robot to be launched according to the requirement of different water areas, so that the working efficiency is obviously improved; the robot may adapt to the various environments in the drainage pipeline and complete the inspection of the pipeline interior in different environments. The flexible structure mode switching enables the robot to work in the environment where the water depth changes such as culverts and pipelines, thus enhances the practicability of the robot;

2) Based on the detection module carried by the robot, the disclosure may obtain the environmental information and position information in real time, and makes it convenient for workers to mark the position of pipeline defects. In the prior art, the towing cable is used for communication and positioning realized by measuring the length of the towing cable, but the operation of the robot is restricted because the relaxation and bending of the towing cable affect the positioning accuracy of the inspection equipment. By adopting the wireless communication and the inertial measurement unit for positioning, the disclosure avoids the winding of the towing cable, reduces the driving resistance and improves the positioning accuracy;

3) The amphibious robot for in-service inspection of drainage pipelines and the control method of the disclosure may carry out structure conversion in time, and the sonar also flexibly stretches out and retracts with the structure conversion process, and the front, rear, left and right cameras are all zoom cameras rotatable in the horizontal and vertical directions, so that the ultra-high definition panoramic image in the pipeline may be obtained through the mosaicking and fusion of multi-camera images, the detection and identification of defects in the pipeline are facilitated, and more comprehensive and clearer pipeline status information may be obtained.

The above is only the preferred embodiments of the present disclosure, and does not limit the present disclosure. Any form of equivalent substitution, modification and other changes made by any technical personnel in the art to the technical scheme and technical content disclosed in the present disclosure belong to the content of the technical scheme of the present disclosure and fall in the protection scope of the present disclosure.

What is claimed is:

1. An amphibious robot for in-service inspection of drainage pipelines, comprising a robot body, a detection module, a propulsion module, a structure conversion module, a ground terminal controller, a mobile terminal controller and a power module, wherein
    as a carrier of modules, the robot body comprises a control box and floating bodies;
    the detection module is used for collecting environmental information and pose information of a robot to determine states of position and orientation of the robot as well as environmental states within a pipeline;
    the propulsion module is used for controlling movement of the robot, and the propulsion module comprises a car-like propulsion module and a ship-like propulsion module;
    the structure conversion module is used for controlling the robot to switch between structures of a car-like working mode and a ship-like working mode;
    the ground terminal controller is used for information integration and instruction transmission, the ground terminal controller receives information collected by the detection module through the mobile terminal controller, and the ground terminal controller sends a structure conversion instruction to the structure conversion module and sends a propulsion instruction to the propulsion module through the mobile terminal controller respectively;
    the mobile terminal controller is used for receiving and transmitting the information collected by the detection module, processing the information, and making autonomous control decisions; the mobile terminal controller is also used for receiving instructions issued by the ground terminal controller, and controlling movement and structural switching of the robot through the propulsion module and the structure conversion module; and
    the power module is used for supplying power to the detection module, the propulsion module, the structure conversion module, the ground terminal controller and the mobile terminal controller;
    wherein a main support and a hull frame are arranged below the control box, and the floating bodies are connected with the structure conversion module through the main support; the structure conversion module comprises stepping motors, telescopic frames and telescopic cross bars, wherein the telescopic frames are arranged on the main support, and the stepping motors control the telescopic frames to fold or extend through the telescopic cross bars; when the telescopic frames are folded, the structure conversion module drives the robot body to be converted into the ship-like working mode; and when the telescopic frames are extended, the structure conversion module drives the robot body to be converted into the car-like working mode.

2. The amphibious robot for in-service inspection of the drainage pipelines according to claim 1, wherein the ground terminal controller comprises a display screen, an operating handle, a remote controller and a first wireless communication module, wherein
    the display screen is used for visualizing the information detected by the detection module in a working process;
    the operating handle is used for sending the structure conversion instruction and the propulsion instruction for controlling the robot;
    the remote controller is used for remotely monitoring the environmental information and the pose information of the robot at the ground terminal and making robot action decisions; and
    the first wireless communication module is used for transceiving remote data of the ground terminal controller;
    the mobile terminal controller comprises a data interface, a main controller and a second wireless communication module, wherein
    the data interface is used for communication between the mobile terminal controller and the detection module, the structure conversion module and the propulsion module;
    the main controller is used for controlling the structure conversion module, the car-like propulsion module and the ship-like propulsion module to perform corresponding operations according to the instructions sent by the remote controller or decisions made by the main controller;
    the second wireless communication module is used for a remote data transceiving of the mobile terminal controller; and the first wireless communication module is in signal connection with the second wireless communication module.

3. The amphibious robot for in-service inspection of the drainage pipelines according to claim 1, wherein the detection module comprises camera modules installed on the control box, a sonar installed below the control box, a lidar installed on the control box and an inertial measurement unit installed in the control box, wherein
the camera modules comprise cameras, illumination light sources and platforms, wherein the cameras and the illumination light sources are both installed on the platforms;
the sonar is used for detecting a water depth and underwater environment in the pipeline;
the lidar is used for sensing environment above a water surface in the pipeline; and
the inertial measurement unit is used for sensing position information and orientation information of the robot.

4. The amphibious robot for in-service inspection of the drainage pipelines according to claim 3, wherein the detection module further comprises a GPS positioning module, the GPS positioning module is installed on the control box, and the GPS positioning module is used for obtaining geographic coordinates of the robot at an inlet position and cooperating with the inertial measurement unit to obtain geographic coordinates of the robot in the pipeline, so as to achieve a precise positioning of the robot;
the camera modules are circumferentially arranged above the control box, the cameras and the illumination light sources are arranged side by side, and the ground terminal controller adjusts the camera modules through the mobile terminal controller, the cameras and the illumination light sources synchronously rotate in horizontal and vertical directions on the platforms through fine-tuning rods; and
the sonar is arranged below the control box through a lifting mechanism, and the ground terminal controller adjusts the position of the sonar through the mobile terminal controller, and the sonar is retracted or lowered through the lifting mechanism.

5. The amphibious robot for in-service inspection of the drainage pipelines according to claim 1, wherein the control box is placed on a top side of the main support through the hull frame, the telescopic frames are placed on a bottom side of the main support, and the floating bodies are placed on the main support through the telescopic cross bars;
the ends of the main support are provided with horizontal telescopic grooves, one end of each telescopic cross bar is placed in the telescopic groove, and the other end of the each telescopic cross bar is connected with the floating body; the telescopic grooves are provided with guide grooves arranged along a lengthwise direction, and ends of the telescopic frames are connected with the telescopic cross bars through the guide grooves; the stepping motors control the telescopic cross bars to move horizontally in the telescopic grooves, top ends of the telescopic frames move horizontally along the guide grooves along with telescopic movement of the telescopic cross bars; and
the telescopic frames are cross-hinged scissors-type telescopic mechanisms; when the top ends of the telescopic frames are driven by the telescopic cross bars to move outwards relatively, the telescopic frames are cross-folded, so that the control box moves down and is converted into the ship-like working mode; and when the top ends of the telescopic frames are driven by the telescopic cross bars to move inwards relatively, the telescopic frames are cross-extended, so the control box moves up and is converted into the car-like working mode.

6. The amphibious robot for in-service inspection of the drainage pipelines according to claim 1, wherein the car-like propulsion module comprises underwater electric wheels and an electric wheel controller, and the robot realizes a steering function through a rotational speed difference between left and right underwater electric wheels; the electric wheel controller is in control connection with the underwater electric wheels, and the mobile terminal controller is in control connection with the electric wheel controller; and the underwater electric wheels are arranged at bottom ends of the telescopic frames.

7. The amphibious robot for in-service inspection of the drainage pipelines according to claim 1, wherein the ship-like propulsion module comprises underwater propellers and a propeller controller, and the robot realizes the steering function through a rotational speed difference between left and right underwater propellers; the underwater propellers are in control connection with the propeller controller, and the mobile terminal controller is in control connection with the propeller controller; and the underwater propellers are fixed on the floating bodies.

8. A control method of the amphibious robot for in-service inspection of the drainage pipelines, adopting the amphibious robot for in-service inspection of the drainage pipelines according to claim 1, comprising following steps:
S1, putting the robot into the pipeline from an inlet position, starting the robot and completing initializations of corresponding modules, and proceeding to S2;
S2, turning on a communication between the ground terminal controller and the robot, wherein the mobile terminal controller collects the environmental information in the pipeline through the detection module, and proceeding to S3 when the ground terminal controller receives picture information transmitted by the mobile terminal controller;
S3, checking an environmental state in the pipeline through the display screen of the ground terminal controller, and determining a working mode for the robot;
in the event of no water or a first water level in the pipeline, switching to S4; and
in the event of a second water level higher than the first water level-moderate or a third water level higher than the second water level-high water level in the pipeline, switching to S5;
S4, remaining unchanged if the robot is originally in the car-like working mode;
converting the robot into the car-like working mode through a structure conversion module if the robot is originally in a ship-like working mode; and
at a same time, retracting the sonar of the detection module, and proceeding to S6;
S5, remaining unchanged if the robot is originally in the ship-like working mode;
converting the robot into the ship-like working mode through the structure conversion module if the robot is originally in the car-like working mode;
at a same time, stretching out the sonar of the detection module, and proceeding to the S6;
S6: the robot entering a working state, controlling the robot to move by the propulsion module, and the mobile terminal controller collecting and storing images of environment above water in the pipeline through camera modules and the lidar, and the mobile terminal controller collecting and storing sonar images of underwater environment in the pipeline through the sonar, and transmitting both the images and the sonar images to the ground terminal controller;

proceeding to the S3 if the work continues;

proceeding to S7 if the work ends; and

S7: sending an instruction to the mobile terminal controller through the ground terminal controller to control the robot to move to the inlet position, taking the robot back to the ground, disconnecting the communication between the ground terminal controller and the robot, and manually turning off the power module to complete a whole inspection work.

9. The control method of the amphibious robot for in-service inspection of the drainage pipelines according to claim 8, wherein in the S3, three operation modes are adopted when determining the working mode for the robot:

(1) a manual remote control: the operator makes a decision according to the environmental information and robot state information received by the ground terminal controller and sent by the mobile terminal controller, and gives instructions through the operating handle;

(2) a full autonomous control of the system: the mobile terminal controller autonomously makes judgments and gives instructions through a data interface according to the environmental information and the robot state information collected by the detection module; and (3) a semi-autonomous control of the system under manual monitoring: monitoring personnel monitor a whole process through the ground terminal controller, and the mobile terminal controller takes a main role to autonomously make judgments and give instructions through the data interface according to the environmental information and the state information of the robot collected by the detection module; but a manual intervention is carried out when necessary, and the instructions are issued directly through the operating handle, and the instructions issued by the operating handle have a higher priority than the instructions autonomously made by the system;

in the S4, when the robot is converted from the ship-like working mode to the car-like working mode, the telescopic cross bars are controlled by the stepping motors to retract, and the floating bodies are driven to retract inwards, and at the same time the telescopic frames are driven to be lowered in an extended state; and in the S5, when the robot is converted from the car-like working mode to the ship-like working mode, the telescopic cross bars are controlled by the stepping motors to extend, and the floating bodies are driven to extend outwards, so the telescopic frames are folded into a folded state.

* * * * *